Patented Nov. 30, 1943

2,335,731

UNITED STATES PATENT OFFICE 2,335,731

HYDROGENOLYSIS OF POLYHYDRIC ALCOHOLS

Robert R. Bottoms, Crestwood, Ky.

No Drawing. Application October 3, 1938, Serial No. 233,031

8 Claims. (Cl. 260—635)

This invention relates to improvements in the art of hydrogenolysis of polyhydric alcohols and has for its principal object the production of glycerine, and other products from the said polyhydric alcohols.

Another object of the invention is to provide means whereby agricultural waste materials may be converted to valuable products.

A further object of my invention is to provide an improved means of controlling the hydrogenolysis of polyhydric alcohols whereby excessive side reactions are prevented and maximum yields of glycerine obtained.

The polyhydric alcohols herein particularly referred to are the pentitols and hexitols and are easily obtained in practically theoretical yields, by the well known methods of catalytic hydrogenation, electrolytic reduction or through reduction with metallic sodium of carbohydrate materials.

The pentitols, arabitol and xylitol, are obtained from arabinose and xylose respectively, by catalytic hydrogenation. Xylose occurs abundantly in the form of xylans in various agricultural wastes and comprises for example from 20% to 40% of the weight of such materials as corn cobs, cotton seed hulls, oat hulls, wheat straw, and the like. Xylose is easily and cheaply extracted from such waste materials, and can then be reduced to xylitol, and further converted in accordance with my process into glycerine and ethylene glycol.

The hexitols, more particularly sorbitol, mannitol and dulcitol, may be obtained conveniently by the catalytic hydrogenation of carbohydrate materials, such as sugars, starches, gums and cellulose. Sorbitol may be produced by the catalytic reduction of glucose and therefore also from carbohydrates that furnish glucose upon hydrolysis, namely, starch, cellulose, cane sugar, together with mannitol, and milk sugar, together with dulcitol. Mannitol is obtained by the reduction or hydrogenation of levulose, and therefore from those saccharides yielding levulose upon hydrolysis, such for example as inulin, and cane sugar, which latter yields an equal weight of sorbitol. Dulcitol is obtained by catalytic reduction of galactose which in turn may be obtained by the hydrolysis of wood gums, galactins, agar, and milk sugar, together with glucose. All of these hexitols may then be further converted in accordance with my process into glycerine.

Methods have previously been proposed for converting saccharides and polyhydric alcohols into propylene glycol and glycerine by processes of catalytic hydrogenolysis. However, I have found through a great many tests of the proposed processes that yields of glycerine by such methods are uneconomic and that other reduction products, such as propylene glycol, and hydrocarbons predominate. Glycerine is not now produced and, so far as I am aware, has never been produced commercially by any of the proposed reduction processes, although it has been produced by fermentation methods.

In general my invention comprises treating polyhydric alcohols, or substances initially yielding such alcohols upon reduction, in water solution, with hydrogen under superatmospheric pressure, at elevated temperature, in the presence of hydrogenation catalysts. The hydrogenolysis is carried out in the presence of certain other substances which assist in the hydrogenolytic cleavage of the polyhydric alcohol molecule, and at the same time inhibit more far-reaching action which would result in splitting off of water and the consequent formation of lower hydroxylated bodies and finally of hydrocarbons.

I have discovered that polyhydric alcohols when subjected to hydrogenolysis under certain limits of temperature and pressure and in the presence of salts of the alkali metals, alkali earth metals, and nitrogen bases, and at a pH in the range below 7, are smoothly converted with high yields into glycerine or into glycerine and ethylene glycol, depending upon whether hexitols or pentitols are employed, and further that only a relatively small proportion of the glycerine or glycol initially formed are further reduced with the formation of products of lower value, as in the case with previously proposed processes.

Among the salts that may be employed to advantage in my process are salts of alkali metals, alkali earth metals and the nitrogen bases in combination with halogen acids or with oxygenated acids derived from phosphorus sulphur, and vanadium. A single salt may be employed or a mixture of two or more salts, and they may be used in various amounts, from 0.1% to more than 15 to 20% of the weight of the polyhydric alcohol used. However, I have found that little advantage is obtained by employing more than about 1% to 3% of the weight of the polyhydric alcohol.

When so employed in my process, the beforementioned salts, even in small amounts, exert a powerful directive action on the course of the reaction, first by assisting in the cleavage of the long chain molecule, and second by inhibiting further destructive hydrogenation of the desirable products. As employed in my process, the said salts can not be considered as conventional "promoters," as the term is usually understood. For this reason the term "guidants" will be used herein in classifying their action.

I have found that the carbonates, silicates and aluminates of the alkalies can not be employed in my process, but it will be apparent that these salts can not exist as such in solutions where a pH is maintained on the acid side.

In carrying out the process in accordance with my invention, any of the well known hydrogenation catalysts may be employed. For example, I may employ active metallic nickel, nickel oxide, copper, silver, cobalt, iron platinum, etc., or mixtures of the same, or I may employ copper chromite, nickel chromite, and the like hydrogenation catalysts. The use of any specific catalyst does not constitute any part of my invention, but from economic considerations I prefer to use active metallic nickel or mixed nickel-copper catalyst.

The following examples will serve to illustrate several ways of carrying out my invention, but other ways will suggest themselves to those skilled in the art, without departing from the scope of my invention.

Example 1

To 500 grams xylitol, prepared by reduction of xylose, in 50% water solution, are added 10 grams potassium chloride, and 10 grams nickel catalyst. The mixture is introduced into an autoclave. Hydrogen is led in under a pressure of about 1200 pounds per square inch and the temperature raised to about 235° C. The pressure will increase due to thermal expansion to about 1500 pounds before absorption of hydrogen begins. At the above temperature the absorption of hydrogen is rapid and the pressure quickly declines. When the pressure reaches about 1000 pounds per square inch more hydrogen is introduced until the pressure is again about 1500 pounds, and this procedure repeated until about 80 liters of hydrogen have been absorbed. This requires from forty-five minutes to two hours. After cooling, the solution is removed from the autoclave, and is neutralized, filtered, and the water removed by distillation. The reaction product is then subjected first to vacuum distillation to recover the ethylene glycol, and then to distillation with superheated steam at about 40 m. m. pressure and at 175° to 180° C. to recover glycerine. About 20% of unchanged xylitol will remain in the distillation flask and may be reused. The yield of glycol and glycerine will approximate from 85% to 90% of theory.

Example 2

A solution is prepared consisting of 600 grams sorbitol, 500 cc. water, 5 grams sodium sulfate and 5 grams sodium vanadate. 10 grams nickel catalyst are added and the mixture placed in an autoclave. The temperature is raised to 225° to 235° C. and the hydrogen pressure to about 1500 pounds per square inch. Hydrogen is introduced as in Example 1 until about 75 liters have been absorbed. The solution is then treated as in Example 1. Upon vacuum distillation, a small amount of propylene glycol will come over at a temperature of 100° to 130° at 30 m. m. pressure, after which the glycerine is recovered by steam distillation as before. From 20% to 30% of unchanged sorbitol will remain in the flask, and may be reused. Propylene glycol to the extent of about 10% of theoretical will be recovered while the yield of glycerine will be from 75% to 80% of theory.

Example 3

600 grams raw cane sugar, which contains about 1.25 to 1.4% ash consisting principally of the chlorides, phosphates, sulphates and carbonates of potassium, calcium, magnesium and sodium, are dissolved in about 500 cc. of water and inverted by heating for an hour to about 90° C. with about 2 grams sulfuric acid. The solution is then brought to a pH of 3 to 5 with soda ash and is then introduced into the autoclave with 10 grams nickel catalyst. The temperature is raised to 130° C. to 140° C. and hydrogen introduced at a pressure of 1200 to 1500 pounds until the pressure no longer declines when the supply of hydrogen is shut off. This treatment results in the reduction of the invert sugar to a mixture of equal parts of sorbitol and mannitol. The temperature is now increased to about 175° C. and reduction continued as in the previous examples until about 75 liters additional hydrogen has been introduced. The product is then worked up as in Example 2 and with about the same yields of products. In this example the raw sugar already contains the necessary salts required in my process.

Example 4

500 grams sorbitol are dissolved in 500 cc. water, 5 grams methylamine hydrochloride and 10 grams nickel catalyst are added and the mixture autoclaved at 230° C. and about 1500 pounds per square inch hydrogen pressure until about 65 liters of hydrogen have been absorbed. The product is then worked up as in previous examples, and with about the same yields of products.

In the foregoing examples I have specified steam distillation of the glycerine, but I may use simple vacuum distillation, although when so treated the glycerine has a tendency to decomposition and polymerization due to the presence of the salts. The salts may, however, be removed from the partially dehydrated product by dissolving the same in alcohol and then filtering.

The acidity of the solutions mentioned in the preceding examples may be adjusted to a pH less than 7 in any manner understood in the art, such as by the addition of various kinds of acids, it being understood, of course, that the acids which are the more readily separated by distillation are preferable.

The temperature range which I may employ in my process is 150° C. to 300° C. and the pressure from 25 to 300 atmospheres. I have found, however, that a temperature range of 175° C. to about 235° C. and a pressure of about 100 atmospheres are highly satisfactory.

It is to be understood in this specification and in the appended claims that "polyhydric alcohol" may be formed in the initial hydrogenolysis of pentoses, hexoses, and di- and poly-saccharides, in the manner described in connection with Example 3, and that the appended claims are intended to cover a process in which such starting materials are employed and the said polyhydric alcohols formed in the course of the reaction.

While I have shown my invention in several forms, it will be obvious to those skilled in the art that it is not so limited, but is susceptible of various other changes and modifications, without departing from the spirit thereof.

What I claim is:

1. In a process of producing glycerine and a glycol including the formation of an aqueous solution of hexahydric alcohols, the steps which comprise converting a solution of raw cane sugar to a mixture of hexahydric alcohols and subjecting the mixture of alcohols thus produced to the action of hydrogen at a pressure around 100 atmospheres and at a temperature from 150° to 300° C. in the presence of a hydrogenation catalyst and at a pH less than 7.

2. The process of producing glycerine and ethylene glycol from xylitol which includes subjecting an aqueous solution thereof to the action of hydrogen at a pressure in the range of 25 to 300 atmospheres and at a temperature in the range from 150° to 300° C. in the presence of a hydrogenation catalyst, at a pH less than 7, and in the presence of at least one salt stable in the said solution and selected from the group consisting of the halogen acid salts and sulphates of the alkali metals and amines.

3. The process of producing glycerine and a glycol from a water solution of polyhydric alcohols selected from the group consisting of pentitols and hexitols which includes the hydrogenolysis of said alcohols at a pressure of 25 to 300 atmospheres and a temperature of 150° to 300° C. in the presence of a hydrogenation catalyst and at least one salt stable in said solution and selected from the group consisting of the halogen acid salts and sulphates of the alkali salts and amines and at a pH below 7.

4. The process of producing glycerine from polyhydric alcohols selected from the group consisting of pentitols and hexitols which comprises subjecting an aqueous solution of at least one of said alcohols to catalytic hydrogenolysis at a pressure around 100 atmospheres and at a temperature of from 150° C. to 300° C. and at a pH less than 7, in the presence of a hydrogenation catalyst and at least one salt stable in the said solution selected from the group consisting of the halogen acid salts and sulphates of the alkali metals and amines.

5. The process of producing glycerine from polyhydric alcohols selected from the group consisting of pentitols and hexitols which comprises subjecting an aqueous solution of at least one of the said polyhydric alcohols to catalytic hydrogenolysis at a pressure of around 100 atmospheres and a temperature of from 175° to 235° C. and at a pH less than 7, in the presence of a hydrogenation catalyst and at least one salt stable in the said solution selected from the group consisting of the halogen acid salts and sulphates of the alkali metals and amines.

6. The process of producing glycerine and a glycol from hexitols which includes subjecting an aqueous solution thereof to the action of hydrogen at a pressure in the range of 25 to 300 atmospheres and at a temperature in the range from 150° to 300° C. in the presence of a hydrogenation catalyst, at a pH less than 7 and in the presence of sodium sulphate.

7. The process of producing glycerine and a glycol from hexitols which includes subjecting an aqueous solution thereof to the action of hydrogen at a pressure in the range of 25 to 300 atmospheres and at a temperature in the range from 150° to 300° C. in the presence of a hydrogenation catalyst, at a pH less than 7 and in the presence of sodium chloride.

8. The process of producing glycerine and a glycol from a polyhydric alcohol selected from the pentitols and hexitols which comprises subjecting the alcohol to catalytic hydrogenolysis at a temperature of from 150° to 300° C., a pressure of from 25 to 300 atmospheres and at a pH less than 7 in the presence of a hydrogenation catalyst and at least one salt stable in the said solution and selected from the group consisting of the halogen acid salts and sulphates of the alkali metals and amines.

ROBERT R. BOTTOMS.